US008573390B2

(12) United States Patent
Andrews et al.

(10) Patent No.: US 8,573,390 B2
(45) Date of Patent: Nov. 5, 2013

(54) MATERIAL TRANSPORT SYSTEMS INCLUDING A TRANSPORT BELT HAVING RESISTANCE TO LASER RADIATION DAMAGE AND METHODS OF CUTTING SUBSTRATES IN MATERIAL TRANSPORT SYSTEMS WITH LASER RADIATION

(75) Inventors: John R. Andrews, Fairport, NY (US); Richard R. Scarlata, Rochester, NY (US); Paul K. Robinson, Spencerport, NY (US)

(73) Assignee: Xerox Corporation, Norwalk, CT (US)

( * ) Notice: Subject to any disclaimer, the term of this patent is extended or adjusted under 35 U.S.C. 154(b) by 514 days.

(21) Appl. No.: 12/720,065

(22) Filed: Mar. 9, 2010

(65) Prior Publication Data

US 2011/0220468 A1 Sep. 15, 2011

(51) Int. Cl.
*B65G 15/34* (2006.01)

(52) U.S. Cl.
USPC .......................................... 198/847; 198/844.1

(58) Field of Classification Search
USPC .............................................. 198/844.1, 847
See application file for complete search history.

(56) References Cited

U.S. PATENT DOCUMENTS

| 4,246,462 | A | * | 1/1981 | Meisel | 219/700 |
|---|---|---|---|---|---|
| 4,265,789 | A | * | 5/1981 | Christopherson et al. | 252/511 |
| 4,465,919 | A | * | 8/1984 | Roder | 219/121.67 |
| 5,002,178 | A | * | 3/1991 | Yamada | 198/847 |
| 5,439,431 | A | * | 8/1995 | Hessbruggen et al. | 483/14 |
| 5,481,084 | A | * | 1/1996 | Patrick et al. | 219/123 |
| 5,759,655 | A | * | 6/1998 | Kitajima et al. | 428/36.91 |
| 6,143,157 | A | * | 11/2000 | Andrus et al. | 205/205 |
| 6,165,340 | A | * | 12/2000 | Andrus et al. | 205/118 |
| 6,229,114 | B1 | | 5/2001 | Andrews et al. | |
| 6,284,813 | B1 | * | 9/2001 | Leppard et al. | 522/8 |
| 6,445,969 | B1 | * | 9/2002 | Kenney et al. | 700/108 |
| 6,594,465 | B2 | * | 7/2003 | Rohde et al. | 399/336 |
| 6,774,250 | B1 | * | 8/2004 | Hatton et al. | 549/546 |
| 7,709,566 | B2 | * | 5/2010 | Hoshikawa et al. | 524/319 |
| 7,939,175 | B2 | * | 5/2011 | Alexander et al. | 428/493 |
| 8,007,917 | B2 | * | 8/2011 | Alexander et al. | 428/493 |
| 2005/0249527 | A1 | * | 11/2005 | Kuramoto | 399/302 |
| 2008/0037069 | A1 | | 2/2008 | Mestha et al. | |
| 2008/0118745 | A1 | * | 5/2008 | Endres et al. | 428/336 |
| 2008/0214714 | A1 | * | 9/2008 | Hoshikawa et al. | 524/319 |
| 2008/0269385 | A1 | * | 10/2008 | Alexander et al. | 524/147 |
| 2009/0014122 | A1 | * | 1/2009 | Ishibuchi et al. | 156/325 |
| 2010/0044189 | A1 | * | 2/2010 | Alexander et al. | 198/846 |
| 2010/0314039 | A1 | * | 12/2010 | Kamoi et al. | 156/258 |
| 2011/0013927 | A1 | * | 1/2011 | Sugiyama | 399/99 |
| 2011/0155721 | A1 | * | 6/2011 | Kladias et al. | 219/634 |
| 2011/0293923 | A1 | * | 12/2011 | Schmidt et al. | 428/329 |

* cited by examiner

*Primary Examiner* — Joseph Dillon, Jr.
(74) *Attorney, Agent, or Firm* — Ronald E. Prass, Jr.; Prass LLP (57) ABSTRACT

Material transport systems including a radiation-resistant transport belt and methods of cutting substrates transported in the material transport systems are provided. An exemplary material transport system includes a continuous transport belt entrained on at least a first roll and a second roll. The transport belt includes at least a first layer and a second layer over the first layer. The first layer includes an inner surface of the transport belt and the second layer includes an outer surface of the transport belt. The second layer can be comprised of copper, copper-based alloys, aluminum, aluminum-based alloys or nickel.

9 Claims, 6 Drawing Sheets

MATERIAL TRANSPORT SYSTEMS INCLUDING A TRANSPORT BELT HAVING RESISTANCE TO LASER RADIATION DAMAGE AND METHODS OF CUTTING SUBSTRATES IN MATERIAL TRANSPORT SYSTEMS WITH LASER RADIATION

BACKGROUND

Lasers can be used for cutting different types of materials, such as sheet metal, cloth and paper, with laser radiation. Lasers can provide precision cutting of these materials.

It would be desirable to provide material transport systems including a transport belt that is resistant to laser radiation damage and methods of cutting substrates in material transport systems with laser radiation.

SUMMARY

Material transport systems including a radiation-resistant transport belt and methods of cutting substrates in the material transport systems are provided. An exemplary embodiment of the material transport systems comprises a continuous transport belt entrained on at least a first roll and a second roll. The transport belt comprises at least a first layer and a second layer over the first layer. The first layer includes an inner surface of the transport belt and the second layer includes an outer surface of the transport belt. The second layer is comprised of a material selected from the group consisting of copper, copper-based alloys, aluminum, aluminum-based alloys and nickel.

DETAILED DESCRIPTION

The disclosed embodiments include material transport systems. An exemplary embodiment of the material transport systems comprises a continuous transport belt entrained on at least a first roll and a second roll. The transport belt comprises at least a first layer and a second layer over the first layer. The first layer includes an inner surface of the transport belt and the second layer includes an outer surface of the transport belt. The second layer is comprised of a material selected from the group consisting of copper, copper-based alloys, aluminum, aluminum-based alloys and nickel.

An exemplary embodiment of a material transport system for cutting substrates comprises a continuous transport belt entrained on at least a first roll and a second roll. The transport belt comprises at least a first layer and a second layer over the first layer. The first layer includes an inner surface of the transport belt and the second layer includes an outer surface of the transport belt. The second layer is comprised of a material selected from the group consisting of copper, copper-based alloys, aluminum, aluminum-based alloys and nickel; and at least one laser cutting system. Each laser cutting system comprises a laser operable to emit laser radiation directed toward the outer surface of the transport belt to cut at least one substrate supported on the outer surface. The second layer of the transport belt is resistant to melting when the laser radiation impinges on the outer surface during cutting of the at least one substrate.

The disclosed embodiments further include methods of cutting substrates in a material transport system. An exemplary embodiment of the methods comprises placing at least one substrate on a continuous transport belt entrained on at least a first roll and a second roll. The transport belt comprises at least a first layer and a second layer over the first layer. The first layer includes an inner surface of the transport belt and the second layer includes an outer surface of the transport belt on which the at least one substrate is supported. The second layer is comprised of a material selected from the group consisting of copper, copper-based alloys, aluminum, aluminum-based alloys and nickel. The method further comprises the at least one substrate with at least one laser cutting system. Each laser cutting system comprises a laser which emits laser radiation directed to cut at least one substrate supported on the outer surface. The laser radiation emitted by each laser cuts through a thickness of the at least one substrate without melting the outer surface of the transport belt.

It has been determined that laser radiation can produce damage in transport belts including a laser-exposed surface comprised of certain metallic materials when these materials are exposed to laser radiation exceeding a threshold laser power level. This laser radiation damage occurs when the materials absorb an amount of the laser radiation that is sufficient to cause excessive local heating and consequent melting and re-solidification of the materials. This melting can occur at relatively low laser power levels. This melting can be the main factor that can lead to distortion, fatigue and rapid, premature failure of such transport belts.

In light of these and other considerations, material transport systems and methods of cutting substrates in material transport systems are provided. The material transport systems are constructed to convey substrates, which can be subjected to laser cutting in the systems. The substrates can be comprised of various metallic and non-metallic materials. The substrates can be cut using laser radiation emitted by one or more laser cutting systems. The material transport systems include a transport belt, which supports the substrates during cutting. The transport belt includes a laser-exposed outer surface, which is comprised of a metallic material that is resistant to laser radiation damage during the cutting process. The transport belts can provide desirable service lives and improved productivity in the material transport systems.

Figure 1:
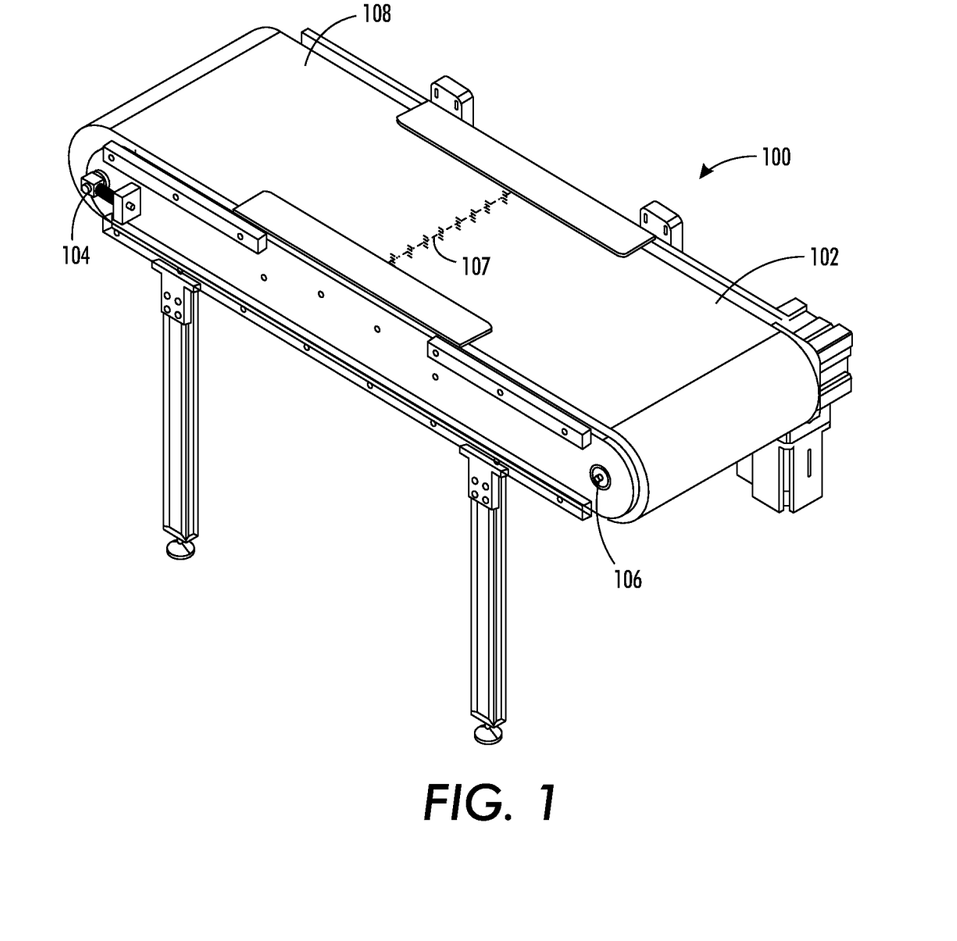
FIG. 1 depicts an exemplary embodiment of a material transport system including a transport belt having resistance to laser radiation damage.

FIG. 1 depicts an exemplary embodiment of a material transport system 100 useful for transporting substrates. The material transport system 100 includes a continuous transport belt 102 entrained on rotatable rolls 104, 106. At least one of the rolls 104, 106 is driven by a motor. The transport belt 102 includes an outer surface 108. The transport belt 102 is rotated by the rolls 104, 106 to convey substrates supported on the outer surface 108. The substrates can be subjected to laser cutting when supported on the outer surface 108.

Figure 2:
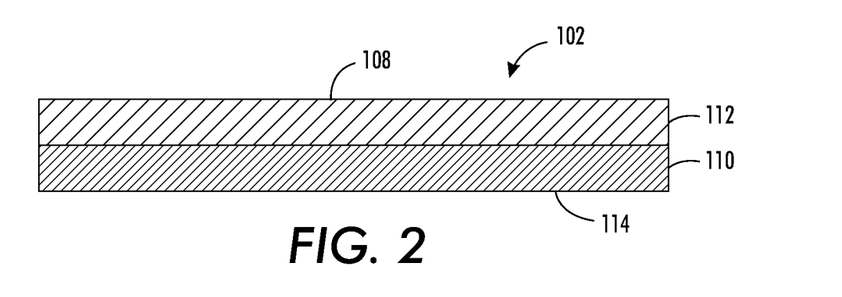
FIG. 2 is a cross-sectional view of an exemplary embodiment of a transport belt having resistance to laser radiation damage.

FIG. 2 depicts an exemplary embodiment of the transport belt 102. The transport belt 102 has a multi-layer construction and includes a first layer 110 and a second layer 112 over the first layer 110. The first layer 110 forms the inner surface 114 and the second layer 112 forms the outer surface 108 of the transport belt 102. In embodiments, each of the first layer 110 and the second layer 112 can comprise one layer or more than one layer. The transport belt 102 can include one or more additional (intermediate) layers disposed between the first layer 110 and the second layer 112.

Embodiments of the transport belt 102 can be made from a single piece of the belt material, or from two or more pieces. The opposite ends of a single piece of the belt material, or ends of two or more pieces of the belt material, can be joined by any suitable technique, such as laser welding, or the like, to form a continuous belt construction. FIG. 1 shows a single-piece, continuous belt construction including a joint 107.

The transport belt 102 is tensioned when entrained on the rolls 104, 106 of the material transport system 100. The transport belt 102 has suitable mechanical properties, including a sufficiently-high tensile strength, to withstand the applied stresses that occur during operation. In the transport belt 102, the first layer 110 is made a metallic material that can provide the desired mechanical properties (e.g., tensile strength) to the transport belt 102. For example, the first layer 110 can be made of various steels, stainless steels, and the like. The first layer 110 can typically have a thickness of about 0.1 mm to about 1 mm.

The second layer 112 is comprised of a metallic material that provides resistance to damage from exposure to laser radiation. The metallic material has a suitable combination of the following properties: reflectivity/absorptivity for the incident laser radiation, melting temperature, heat capacity and thermal conductivity. It is desirable for the metallic material of the second layer 112 to have a sufficiently-high reflectivity and sufficiently-low absorptivity with respect to the wavelength range of the incident laser radiation so that only a small amount of the radiant energy that impinges on the outer surface 108 is coupled into the transport belt 102; a sufficiently-high melting temperature to avoid melting when irradiated with laser radiation; a sufficiently-high heat capacity that the temperature of the second layer 112 remains sufficiently low (below the melting temperature) during irradiation with laser radiation; and a sufficiently-high thermal conductivity to conduct thermal energy away from the second layer 112 to the underlying first layer 110 to contribute to keeping the local temperature of the second layer 112 below the melting temperature. It is also desirable that the second layer 112 has sufficient ductility to resist cracking, delamination, or other mechanical damage during operation.

It has been determined that copper, copper-based alloys, aluminum, aluminum-based alloys, and nickel have a suitable combination of these properties to provide resistance to laser radiation damage when used to make the second layer 112 of the transport belt 102. In embodiments, the copper, copper-based alloys, aluminum, aluminum-based alloys or nickel forming the second layer 112 can have a high purity. For example, high-purity copper, aluminum or nickel can be used to form the second layer 112. The material of the second layer 112 may contain only inevitable impurities in sufficiently-small amounts that substantially do not affect the resistance of the second layer 112 to laser radiation damage.

In embodiments, copper, copper-based alloys, aluminum, aluminum-based alloys, and nickel can be applied directly onto the first layer 110 to form the second layer 112. For example, copper, copper-based alloys, aluminum, aluminum-based alloys and nickel can be applied directly onto a first layer 110 of a stainless steel or a steel. In other embodiments, at least one metallic intermediate layer, such as a nickel layer, can be applied onto the first layer 110, and copper, copper-based alloys, aluminum or aluminum-based alloys can be applied onto the intermediate layer to form the second layer 112.

In embodiments, the second layer 112 can typically have a thickness of about 0.05 mm to about 1 mm.

In embodiments, the material forming the second layer 112 can be applied to the first layer 110 or an intermediate layer by any suitable technique. In exemplary embodiments, the material of the second layer 112 can be laminated onto the first layer 110. For example, copper and copper alloys can be laminated onto stainless steel. Aluminum and aluminum alloys can also be laminated onto the material of the first layer 110. Metal cladding can be used. For example, a layer of copper, a copper alloy, aluminum or an aluminum alloy can be pressed at high temperature and pressure to a steel sheet. In other embodiments, the material of the second layer 112 can be plated onto the first layer 110, or an intermediate layer, using electroplating and electroless plating techniques. Adhesive bonding can also be used to bond the second layer 112 to the first layer 110 or to an intermediate layer. Adhesives having suitable physical properties to withstand the mechanical and thermal stresses and temperatures to which the transport belt 102 is subjected during substrate transport and laser cutting can be used. In other embodiments, the material of the second layer 112 can be applied to the first layer 110 or intermediate layer by a coating technique, such as metal spraying.

Figure 3:
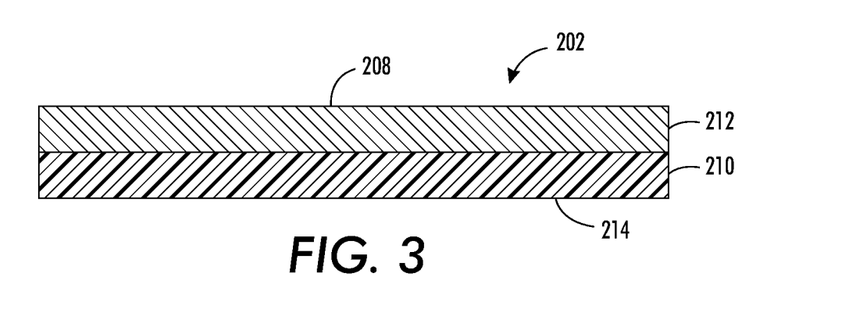
FIG. 3 is a cross-sectional view of another exemplary embodiment of a transport belt having resistance to laser radiation damage.

FIG. 3 depicts a transport belt 202 according to another exemplary embodiment. Embodiments of the transport belt 202 include at least a first layer 210 and a second layer 212. In the transport belt 202, the first layer 210 is made of a polymer. The polymer has sufficient mechanical and thermal properties to withstand the conditions that occur during substrate transport and laser cutting. The polymer can be a thermoplastic material. For example, the first layer 210 can be comprised of polyimide, polyester, or the like. The first layer 210 can typically have a thickness of about 0.1 mm to about 1 mm to provide the desired properties.

The second layer 212 is comprised of a metallic material that provides resistance to damage from exposure to laser radiation. In embodiments, the second layer 212 can be comprised of copper, copper-based alloys, aluminum, aluminum-based alloys, or nickel. In embodiments, the copper, copper-based alloys, aluminum, aluminum-based alloys or nickel forming the second layer 212 can have a high purity. For example, high-purity copper, aluminum or nickel can be used to form the second layer 212. The material of the second layer 212 may contain only inevitable impurities in sufficiently-small amounts that substantially do not affect the resistance of the second layer 212 to laser radiation damage.

The material of the second layer 212 can be applied directly onto the first layer 210. In other embodiments, at least one metallic or non-metallic intermediate layer, such as a nickel layer or a polymer layer, can be applied onto the first layer 210, and copper, copper-based alloys, aluminum or aluminum-based alloys can be applied onto the intermediate layer to form the second layer 212.

In embodiments, the second layer 212 can typically have a thickness of about 0.05 mm to about 1 mm. The thickness of the second layer 212 is sufficient to provide the desired properties to the transport belt 202.

In embodiments, the material of the second layer 212 can be applied to the first layer 210, or to an intermediate layer, by any suitable technique. For example, the second layer 212 can be adhesively bonded to the first layer 210 or an intermediate layer. In exemplary embodiments, copper and copper alloy sheets can be bonded to polyimide. In other embodiments, the second layer 212 can be plated onto the first layer 210. In other embodiments, the second layer 112 can be applied by a coating technique that is suitable for the polymer material of the first layer 210.

Embodiments of the transport belts 102, 202 can include vacuum through holes that extend from the outer surface 108, 208 to the inner surface 114, 214, respectively. For example, one or more rows each including a plurality of vacuum through holes can be formed along the length dimension of the transport belts 102, 202. The vacuum through holes can be evenly spaced from each other along the length dimension and extend along the entire length. The rows of vacuum through holes can be spaced from each other along the width dimension of the belt. The vacuum through holes can be formed by chemical etching, mechanical punching or drilling, for example. A vacuum can be applied by a vacuum plenum behind the transport belts 102, 202 via the vacuum through holes to hold substrates down and in position on the outer surfaces 108, 208 of the transport belts 102, 202.

Figure 4:
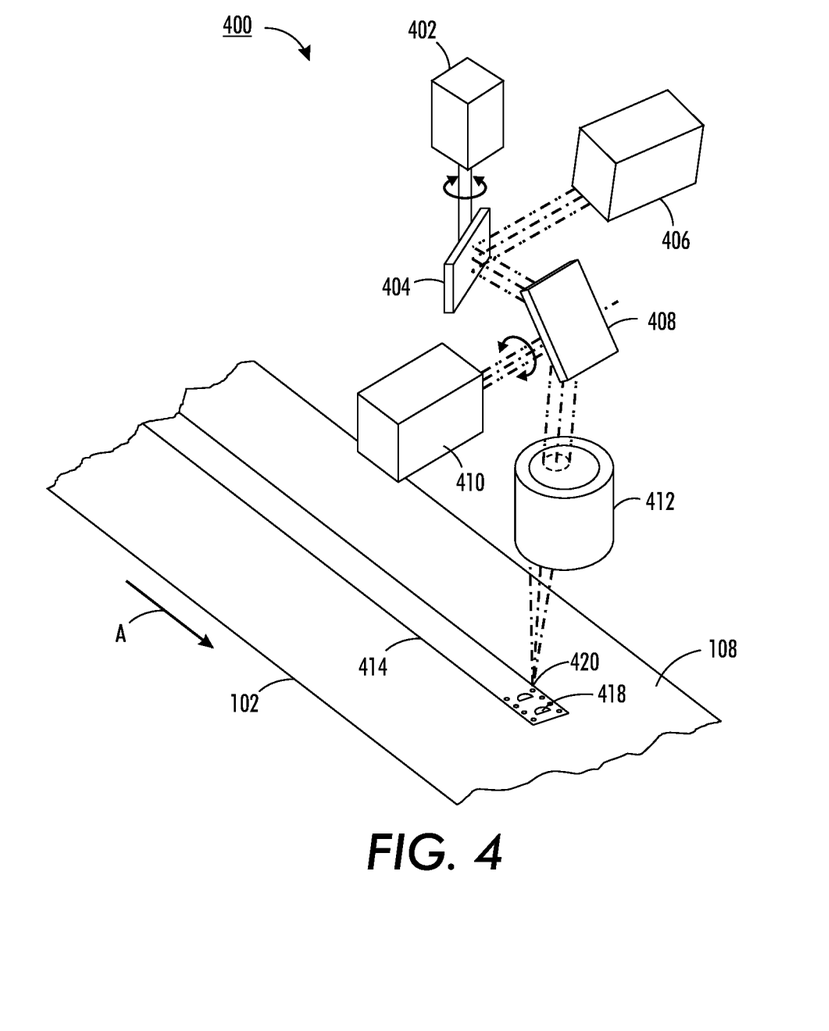
FIG. 4 depicts an exemplary embodiment of a laser cutting system cutting a substrate being transported on a transport belt having resistance to laser radiation damage.

FIG. 4 depicts an exemplary embodiment of a laser cutting system 400 for cutting substrates supported on the outer surface 108 of the transport belt 102. A substrate 414 is shown being cut. The substrate 414 can be comprised of various metallic and non-metallic materials, such as paper, packaging materials, paper laminates, polymers, and the like. Paper substrates can be in roll or sheet form. The paper substrates can typically have a thickness of about 0.05 mm to about 2 mm.

The laser cutting system 400 can cut substrates using flying spot scanning, for example. The laser cutting system 400 includes a laser 406 operable to emit radiation having a desired wavelength and power level. For example, the laser 406 can be $CO_2$ laser, which emits radiation at a wavelength of about 9 μm to about 11 μm. Other lasers that can be used in the laser cutting system 400 include other mid-long wavelength infrared (IR) lasers, near-IR lasers and visible light lasers. In embodiments, the laser 406 can operate at a power level of about 10 W to about 800 W, such as at least about 50 W, at least about 100 W, at least about 200 W, at least about 400 W, or at least about 600 W; at a spot size (e.g., diameter) at the substrate of about 50 μm to at least about 500 μm and a scanning speed of about 0.25 m/s to about 10 m/s. A lower power level can be used to cut substrates, such as paper, at slower scanning speeds.

In the laser cutting system 400, the laser emission is reflected by a first deflecting mirror 404 operatively connected to an x-axis scanner 402, and by a second deflecting mirror 408 operatively connected to a y-axis scanner 410, and then focused to a desired spot size by a scanning lens 412. The focused radiation spot 420 impinges on the substrate 414 and cuts through the thickness of the substrate 414. The laser radiation can be scanned to cut out features 418 of various shapes and sizes in the substrates 414. For example, the features 418 can be characters (letters and/or numbers) or other objects, such as tags. The features 418 can have various geometric shapes, such as polygonal, triangular or curved shapes. Different feature shapes, sizes and patterns can be cut from the same substrate. The cuts made in the substrates can be continuous, e.g., a continuous circular or polygonal cut, or the cuts can be discontinuous to form perforations in the substrates.

In embodiments, the features 418 can be cut from the substrate 414 while moving the substrate 414 at a constant speed in the direction A on the transport belt 102. In other embodiments, the transport belt 102 and substrate 414 can be stationary during the laser cutting process, and then indexed for cutting additional features.

Figure 5:
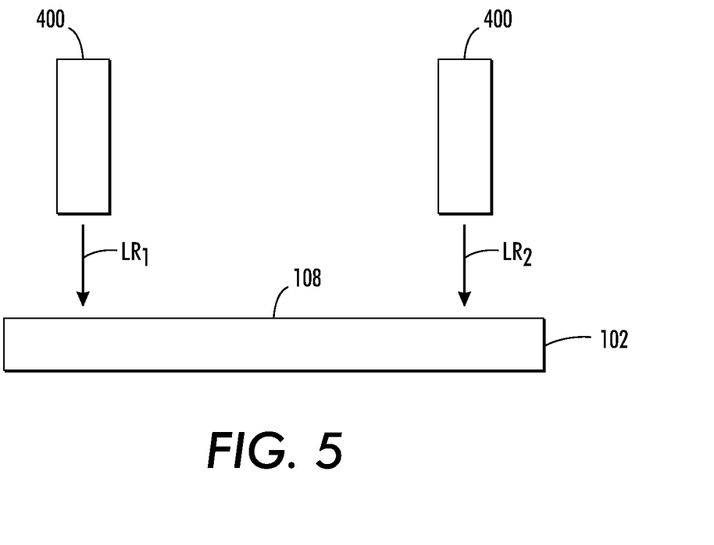
FIG. 5 depicts radiation being emitted by two laterally-spaced laser systems toward a surface of a transport belt having resistance to laser radiation damage.

In other embodiments, two or more laser cutting system can be used for cutting substrates supported on the transport belt. FIG. 5 depicts an exemplary embodiment including two, laterally-spaced laser cutting systems 400. The respective laser cutting systems 400 are operable to emit laser radiation $LR_1$ and $LR_2$ toward the outer surface 108 of the transport belt 102. The laser radiation $LR_1$ and $LR_2$ can be used to cut features simultaneously in the same substrate, or in different substrates, supported on the outer surface 108. The laser cutting systems 400 can each include the same type of laser (e.g., a $CO_2$ laser), or they can include different lasers for added flexibility in cutting operations.

In embodiments, the outer surface of the transport belt 102, 202 can be periodically cleaned to remove debris, such as paper debris, which may absorb thermal energy and potentially cause local regions of the outer surface 108, 208, respectively, to reach higher temperatures during laser cutting operations. For example, a cleaning web, or the like, can be used to clean the outer surfaces 108, 208.

Figure 6:
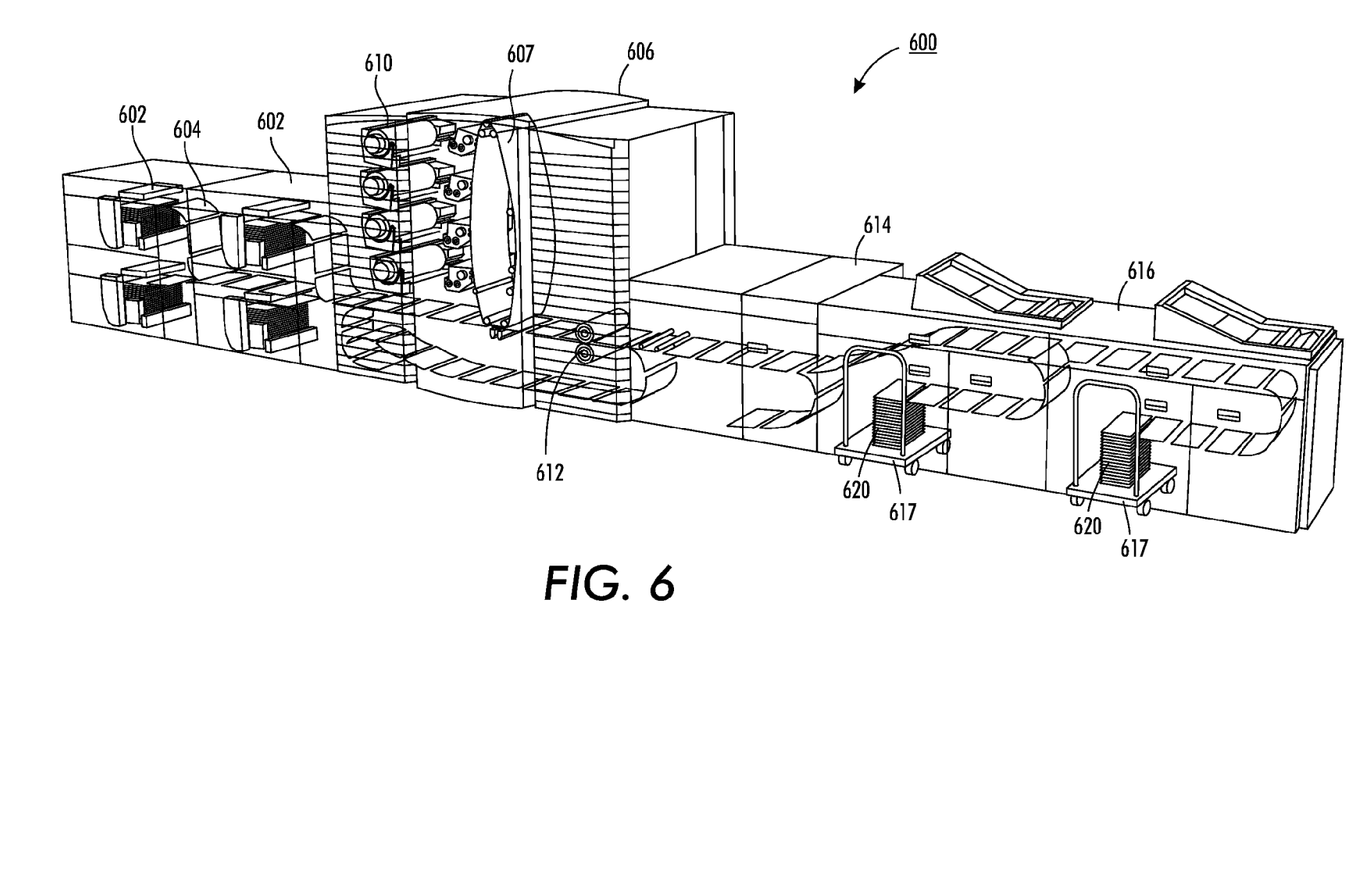
FIG. 6 illustrates an exemplary embodiment of a printing apparatus.

FIG. 6 illustrates an exemplary printing apparatus 600, as disclosed in U.S. Patent Application Publication No. 2008/0037069, which is incorporated herein by reference in its entirety. The printing apparatus 600 can be used to produce prints with different images from media having different sizes and weights. The prints can be cut using embodiments of the material transport systems, such as the material transport system 100.

The printing apparatus 600 includes two feeder modules 602 arranged in series, a printer module 606 adjacent the feeder modules 602, an inverter module 614 adjacent the printer module 606, and two stacker modules 616 arranged in series adjacent the inverter module 614.

In the printer module 606, marking material is transferred from developer stations 610 to a charged photoreceptor belt 607 to form images on the photoreceptor belt and produce prints. The images are transferred to one side of sheets 604 fed through the paper path. The sheets are advanced through a fixing device 600. The inverter module 614 manipulates sheets exiting the printer module 606 by either passing the sheets through to the stacker modules 616, or inverting and returning the sheets to the printer module 606. In the stacker modules 616, the prints are loaded onto stacker carts 617 to form stacks 620.

EXAMPLES

Laser radiation of different power levels was emitted by a $CO_2$ laser and reflected by a rotating mirror of a laser cutting system to scan lines across a top surface of pieces of different test materials in the width dimension of the materials. The test materials included paper, 17-7 PH stainless steel CH900 (12 mil and 15 mil thickness), Inconel 718 (50-55 wt. % Ni+Co, 17-21 wt. % Cr), titanium, 301 FH stainless steel (12 mil and 15 mil thickness), 17-7 C stainless steel, electroplated nickel, aluminum tape and copper tape. For each test material, the laser radiation was scanned at an initial lower power level. Then, the test material was advanced relative to the laser cutting system and another line was scanned across the top surface using a higher power level of the laser radiation. The scanning was repeated using an increased power level of the laser radiation for each successive scan, up to a maximum power level. For the testing, laser radiation scan velocities of 200 mm/s, 400 mm/s, 800 mm/s and 1600 mm/s were used for each test material.

Following scanning at each of the different scan velocities, the metallic test materials were observed for evidence of melting of the top surface. When melting was observed, the threshold laser radiation power that produced the melting was determined. The melting was typically visible to the naked eye. In some cases, a 5× magnification was used to observe the top surface. The paper test materials were observed to determine the threshold laser radiation power that produced paper cut through.

Figure 7:
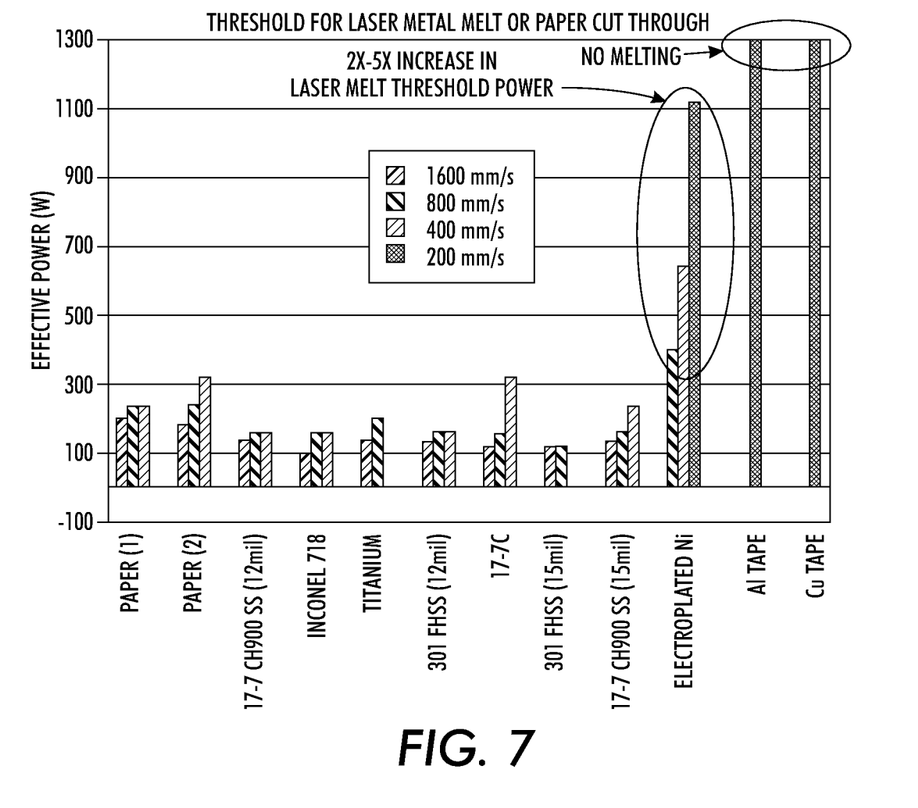
FIG. 7 illustrates a graph showing the threshold effective power of laser radiation for melting metal or cutting through paper at different scan velocities of the laser radiation.

FIG. 7 shows the results for the test materials. In FIG. 7, the effective power of the laser radiation to produce melting of metal test materials or cut through of paper test materials is plotted for the scan velocities of 200 mm/s, 400 mm/s, 800 mm/s and 1600 mm/s. As shown, the threshold power level for melting for each of 17-7 PH stainless steel CH900 (12 mil and 15 mil thickness), Inconel 718, titanium, 301 FH stainless steel (12 mil and 15 mil thickness) and 17-7 C stainless steel was lower than the threshold power for cutting through the paper test materials.

As also shown in FIG. 7, the electroplated nickel test material exhibited an increase of about two times to about five times in threshold power level for melting. The aluminum and copper test materials exhibited no melting and showed no distortion at greater than one order of magnitude higher power levels than any of 17-7 PH stainless steel CH900 (12 mil and 15 mil thickness), Inconel 718, titanium, 301 FH stainless steel (12 mil and 15 mil thickness) and 17-7 C stainless steel.

Other test materials were tested including electroplated copper on stainless steel, copper films laminated to polyimide, copper-clad stainless steel, and aluminum laminates. These test materials were determined to be resistant to laser radiation damage.

It will be appreciated that various ones of the above-disclosed, as well as other features and functions, or alternatives thereof, may be desirably combined into many other different systems or applications. Also, various presently unforeseen or unanticipated alternatives, modifications, variations or improvements therein may be subsequently made by those skilled in the art, which are also intended to be encompassed by the following claims.

What is claimed is:

1. A material transport system, comprising:
a continuous transport belt entrained on at least a first roll and a second roll, the transport belt comprising at least a first layer and a second layer over the first layer, the first layer including an inner surface of the transport belt and the second layer including an outer surface of the transport belt, the second layer that resists degradation caused by laser radiation emitted by a laser cutting system, the second layer being comprised of a material selected from the group consisting of copper, copper-based alloys, aluminum, aluminum-based alloys and nickel, the laser cutting system comprising at least one of a carbon dioxide laser, a mid-long wavelength infrared laser, near infrared laser, and visible laser.

2. The material transport system of claim 1, wherein the second layer of the transport belt consists essentially of copper or a copper-based alloy.

3. The material transport system of claim 1, wherein the second layer of the transport belt consists essentially of aluminum or an aluminum-based alloy.

4. The material transport system of claim 1, wherein the second layer of the transport belt consists essentially of nickel.

5. The material transport system of claim 1, wherein the first layer of the transport belt is comprised of steel or stainless steel.

6. The material transport system of claim 1, wherein the first layer of the transport belt is comprised of a polymer.

7. The material transport system of claim 6, wherein the first layer of the transport belt is comprised of polyimide or polyester.

8. The material transport system of claim 1, wherein the first layer and the second layer of the transport belt comprise a laminate.

9. The material transport system of claim 1, wherein the transport belt comprises at least one metallic intermediate layer disposed between the first layer and the second layer.

* * * * *